United States Patent [19]
Scancarello et al.

[11] Patent Number: 5,960,825
[45] Date of Patent: Oct. 5, 1999

[54] LASER HARDENED REED VALVE

[75] Inventors: Marc Joseph Scancarello, Troy; William Christian Gates, West Milton; Brad Anthony Schulze, Troy, all of Ohio

[73] Assignee: Copeland Corporation, Sidney, Ohio

[21] Appl. No.: 08/883,008

[22] Filed: Jun. 26, 1997

[51] Int. Cl.$^6$ .................................................. F16K 15/00
[52] U.S. Cl. .................... 137/543.19; 137/512; 137/856; 137/852
[58] Field of Search ...................................... 137/852, 851, 137/543.19, 543.21, 512, 855–858, 516.29; 417/571, 567; 251/358

[56] References Cited

U.S. PATENT DOCUMENTS

| | | |
|---|---|---|
| 3,504,148 | 3/1970 | Maximovich et al. . |
| 4,193,424 | 3/1980 | Hrabal . |
| 4,332,997 | 6/1982 | Dudko et al. . |
| 4,336,432 | 6/1982 | Bajorek . |
| 4,438,310 | 3/1984 | Cachat . |
| 4,469,126 | 9/1984 | Simpson ............................ 137/543.19 |
| 4,470,774 | 9/1984 | Chambers .......................... 137/543.19 |
| 4,543,989 | 10/1985 | Lorson ................................ 137/543.19 |
| 4,548,234 | 10/1985 | Prenger .............................. 137/543.19 |
| 4,642,037 | 2/1987 | Fritchman . |
| 4,643,139 | 2/1987 | Hargreaves . |
| 4,696,263 | 9/1987 | Boyesen . |
| 4,729,402 | 3/1988 | Blass et al. ........................ 137/543.19 |
| 4,791,259 | 12/1988 | Pfaffmann . |
| 4,796,855 | 1/1989 | Sofianek . |
| 4,875,503 | 10/1989 | Heger et al. ............................. 137/856 |
| 5,192,200 | 3/1993 | Lilie et al. .............................. 137/855 |
| 5,213,125 | 5/1993 | Leu .................................... 137/512.15 |
| 5,277,556 | 1/1994 | van Lintel . |
| 5,364,244 | 11/1994 | Taylor-McCune et al. ............ 137/858 |
| 5,466,276 | 11/1995 | Sato et al. . |

*Primary Examiner*—Denise L. Ferensic
*Assistant Examiner*—Joanne Y. Kim
*Attorney, Agent, or Firm*—Harness, Dickey & Pierce, P.L.C.

[57] ABSTRACT

A valve assembly has a discharge valve member and a suction valve member. One of these valve members includes a reed valve. The reed valve has a tab which includes a localized through hardened area which provides a wear surface. The remainder to the reed valve has a lower hardness to provide fatigue strength to the reed valve.

17 Claims, 3 Drawing Sheets

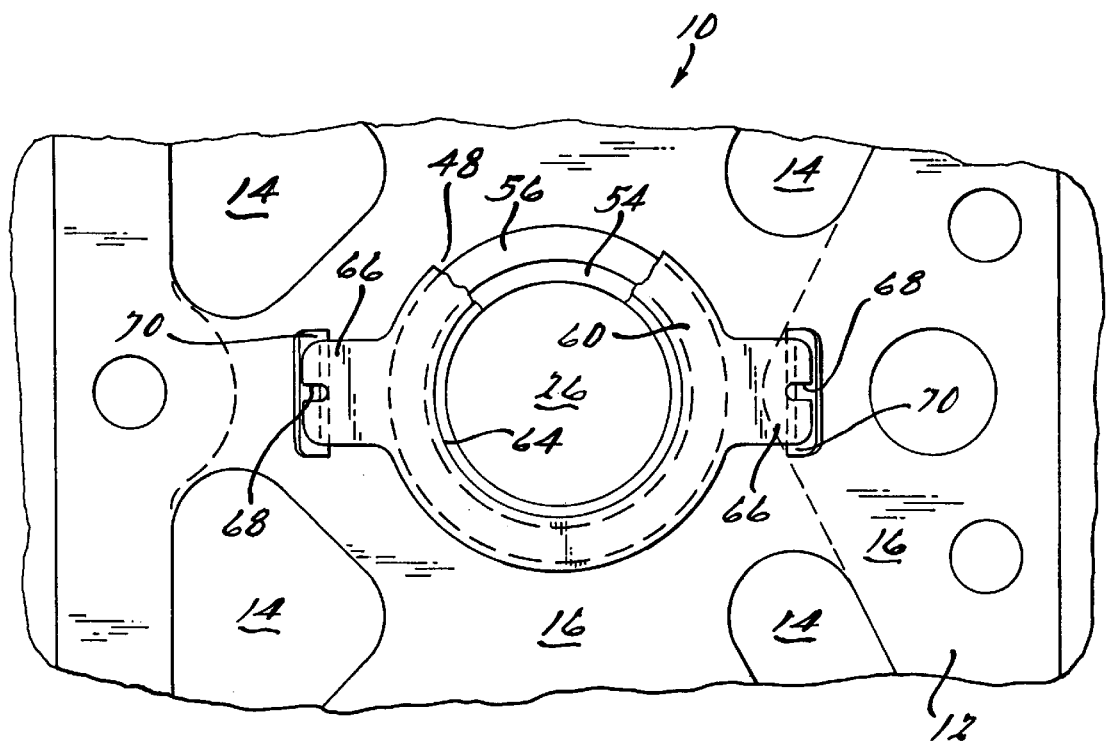
FIG. 2.
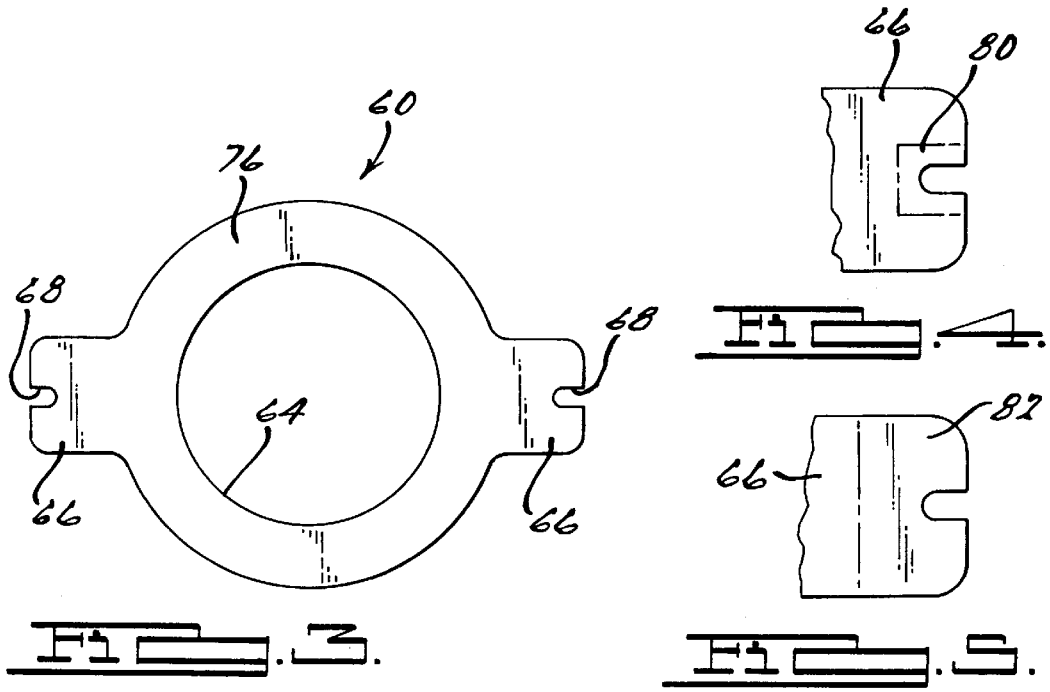
FIG. 3.   FIG. 4.
FIG. 5.

LASER HARDENED REED VALVE

FIELD OF THE INVENTION

The present invention relates generally to pressure responsive valve assemblies. More particularly, the present invention relates to valve assemblies which include laser and induction hardened reed valves. The valve assemblies are adapted for use in reciprocating piston type compressors, such as refrigerant type compressors.

BACKGROUND AND SUMMARY OF THE INVENTION

Reciprocating piston type compressors typically employ suction and discharge pressure actuated valving mounted at the end of the cylinder housing. When designing these valve assemblies, it is of critical importance to overall system operation to provide a sufficiently large port area to permit the flow of a maximum amount of fluid within a given time period and at an acceptably small pressure drop. This is particularly true for refrigeration compressors employed in air conditioning systems because of the relatively high mass flow rates generally required in such systems.

Associated and conflicting with the desirability to maximize port area of a given size cylinder is the need to reduce the weight of the moving valve member. The reduction of the weight of the moving valve member will lead to a limitation of the inertial effect of the valve and a minimization of the noise level associated with the opening and closing of the valve.

Another important design objective is to minimize the re-expansion or clearance volume of the cylinder. The valving system and the cylinder top end wall should have a shape which is complimentary with the shape of the piston to enable the piston to reduce the volume of the compression chamber to a minimum when the piston is at top dead center of its stroke without restricting gas flow. While it may be possible to accomplish this objective by designing a complex piston head shape, manufacturing of this complex shape becomes excessively expensive, the assembly becomes more difficult and throttling losses generally occur as the piston approaches top dead center. Reduction of the re-expansion volume is of great importance in refrigeration compressors having relatively low mass flow rates, such as those units employed in very low temperature refrigeration systems, as well as in compressors used in heat pump applications.

A typical prior art valve assembly which has been developed to meet the above defined design criteria and solve some of the problems associated with the design of valve assemblies is shown in Applicants' Assignee's U.S. Letters Patent No. 4,877,382.

The valve assemblies disclosed in the aforesaid Letters patent No. 4,877,382 and particularly the suction valve insert in the form of an annular ring have performed satisfactorily in prior art compressor assemblies. These prior art compressor assemblies used a chlorofluorocarbon (CFC) refrigerant or a hydrochlorofluorocarbon (HCFC) refrigerant. The lubricating oil for these CFC and HCFC compressors has been a mineral oil based lubricant. The combination of the CFC or HCFC refrigerant and the mineral oil based lubricant provides sufficient cooling and lubrication for the insert in these prior art compressors. CFC and HCFC refrigerants are being phased out in refrigerant compressors due to the well known problems associated with the ozone layer. One refrigerant which is being utilized to replace the CFC and HCFC refrigerant is a hydrofluorocarbon (HFC) refrigerant.

HFC refrigerants do not have an adverse affect on the ozone layer and they are quickly becoming the choice of refrigerant to replace the CFC and HCFC refrigerants. When using HFC refrigerants, the mineral oil based lubricants lose some of their effectiveness and they need to be replaced with alternate and more effective lubricating oils. One lubricant which has shown to be compatible with and effective with HFC refrigerants is a polyolester based lubricant. While the polyolester based lubricants have proven to be a suitable replacement for the mineral oil based lubricants when using HFC refrigerants, there has always been the need to improve and extend the durability of the reciprocating piston designs of compressors.

One component which is being continuously improved is the reed valves associated with the discharge and suction valves of the compressor. The present invention provides the art with a reed valve having a laser hardened retention tab which significantly improves the durability of the reed valve.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 2 is a bottom plan view (from inside the cylinder chamber) of the valve assembly shown in FIG. 1;

FIG. 3 is a plan view of the laser hardened reed valve in accordance with the present invention;

FIG. 4 is an enlarged view of a portion of the reed valve shown in FIG. 3 illustrating the area of the reed valve which is laser hardened in accordance with the present invention;

FIG. 5 is an enlarged view similar to FIG. 4 but illustrating the area of the reed valve which is shot peened in accordance with the present invention;

DETAILED DESCRIPTION OF THE PREFERRED EMBODIMENT

Figure 1:
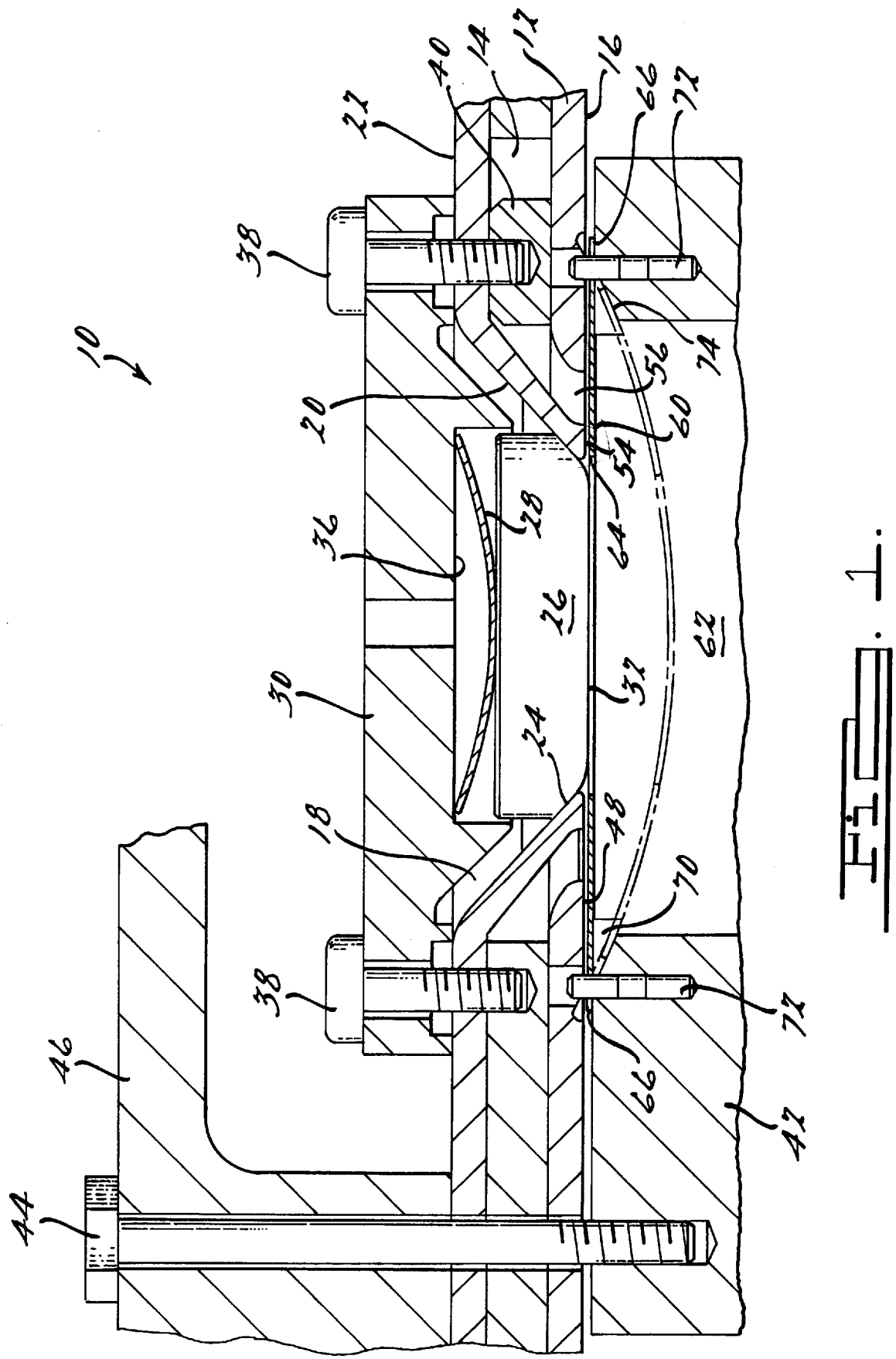
FIG. 1 is a sectional view of a valve assembly incorporating a laser hardened reed valve in accordance with the present invention.

Referring now to the drawings in which like reference numerals designate like or corresponding parts throughout the several views, there is illustrated in FIGS. 1 and 2, a valve assembly in accordance with the present invention which is indicated generally by the reference numeral 10. Valve assembly 10 comprises a valve plate assembly 12 having a relatively large irregularly shaped generally annular recessed portion or suction chamber 14 extending into the lower surface 16 thereof. A discharge chamber 18 of frusto conical shape is also provided, being defined by a radially inwardly inclined or beveled sidewall 20 extending between an upper surface 22 and lower surface 16 of valve plate assembly 12. A surface 24 of sidewall 20 provides a valve seat for a discharge valve member 26 which is urged in to sealing engagement therewith by gas pressure and a Belleville spring 28 extending between valve member 26 and a bridge-like retainer 30.

As shown, discharge valve member 26 is of a size and shape relative to discharge chamber 18 so as to place a lower surface 32 thereof in substantially coplanar relationship to lower surface 16 of valve plate 12. Belleville spring 28 is located in a recess 36 provided in retainer 30. Discharge valve member 26 is essentially pressure actuated and Belleville spring 28 is chosen primarily to provide stability and also an initial closing bias or preload to establish an initial seal. Other types of springs, other than Belleville springs may of course be used for this purpose. Retainer 30, which also serves as a stop to limit the opening movement of valve member 26 is secured to valve plate 12 by a pair of suitable fasteners 38.

A generally annular valve plate insert 40 is disposed within recessed suction chamber 14 into which fasteners 38 extend so as to secure retainer 30. Valve plate assembly 12 is secured to a cylinder housing 42 using a plurality of bolts 44 which extend through a valve cover 46, through valve plate assembly 12 and are threadingly received within cylinder housing 42. A plurality of spaced cutout areas or radially extending slots (not shown) are provided through valve plate insert 40 so as to allow suction fluid flow between radially inner and outer sides thereof.

Valve plate assembly 12 defines an annular valve seat 48 and sidewall 20 defines an annular valve seat 54 at its terminal end. Disposed between valve seat 48 and valve seat 54 is a suction input passage 56.

Valve seat 54 of sidewall 20 is positioned in coplanar relationship with valve seat 48 of valve plate assembly 12. A suction reed valve member 60 in the form of an annular ring sealingly engages, in its closed position, valve seat 54 of sidewall 20 and valve seat 48 of valve plate assembly 12 to prevent passage of fluid from suction chamber 14 through passage 56 and into a compression chamber 62. A central opening 64 is provided in suction reed valve member 60 and is arranged coaxially with discharge chamber 18 so as to allow direct fluid flow communication between compression chamber 62 and lower surface 32 of discharge valve member 26. Suction reed valve member 60 also includes a pair of diametrically opposed radially outwardly extending tabs 66 each of which is provided with a suitable opening or slot 68 extending therethrough. Tabs 66 are received in a notched portion 70 of cylinder housing 42 with a pair of pins 72 extending through openings 68 so as to retain suction reed valve member 60 in operative relationship thereto.

As the reciprocating piston (not shown) disposed within compression chamber 62 moves away from valve assembly 10 during a suction stroke, the pressure differential between compression chamber 62 and suction chamber 14 will cause suction reed valve member 60 to deflect inwardly with respect to compression chamber 62, to its open position, as shown in phantom in FIG. 1, thereby enabling fluid flow from suction chamber 14 into compression chamber 62 through input passage 56 disposed between valve seats 48 and 54. Because only tabs 66 of suction reed valve member 60 extend outwardly beyond the sidewalls of compression chamber 62, suction fluid flow will readily flow into compression chamber 62 around substantially the entire inner and outer peripheries of suction valve member 60. As a compression stroke of the piston begins, suction valve member 60 will be forced into sealing engagement with valve seat 54 and valve seat 48. Discharge valve member 26 will begin to open due to the pressure within compression chamber 62 exceeding the pressure within discharge chamber 18 and the force exerted by spring 28. The compressed gas will be forced through central opening 64, past discharge valve member 26 and into discharge chamber 18. The concentric arrangement of valve plate assembly 12 and reed valve member 60 allow substantially the entire available surface area overlying compression chamber 62 to be utilized for suction and discharge valving and porting, thereby allowing maximum fluid flow both into and out of compression chamber 62.

The continuous stroking of the piston within compression chamber 62 continuously causes suction reed valve member 60 to move between its open and closed positions. Thus, there is a constant bending or flexing of tabs 66. Cylinder housing 42 includes an angled or curved portion 74 at the outer edge of compression chamber 62 to provide a friendly surface for suction reed valve member 60 to bend against, thereby significantly reducing the bending stresses generated within tabs 66.

The present invention is directed to a unique process for the heat treating and surface finishing for tabs 66 which provides a significant increase in both the wear and the flexural fatigue life of tabs 66. The suction reed valve member 60 of the present invention is shown in FIG. 3 and includes a generally circular body 76 defining central opening 64. The pair of diametrically opposed radially outwardly extending tabs 66 are each provided with slot 68.

A typical prior art suction reed valve member similar to valve member 60 is manufactured from a quenched and tempered stainless steel such as Uddeholm 716. These prior art reed valve members have a hardness of HRC 49-53. This hardness provides a wear resistant suction reed valve member that exhibits satisfactory flexural fatigue life characteristics.

Suction reed valve member 60, of the present invention, includes additional heat treating and finishing operations as illustrated in FIGS. 4 and 5. FIG. 4 illustrates an area 80 which is through hardened using a laser hardening process to provide a localized wear surface for slots 68. The laser hardening process begins by coating the area to be heat treated with a graphite spray to allow the laser to couple with the metal. Without the coating, the laser beam will tend to be reflected from the surface instead of being absorbed into and heating the metal. GRAFO 203G Dry Film Lubricant from Grafo Colloids Division of Fuchs Lubricants Company in Emlento, Pa. has provided acceptable results when combined with N-propyl alcohol in a ratio of 4 parts alcohol to 1 part graphite. The coating thickness should be such that the surface of reed valve member 60 is not visible through the coating. The coating should be allowed to dry for at least 5 minutes but not longer than 2 hours before reed valve members 60 are laser heat treated.

The coated reed valve member 10 is then positioned with the laser hardening machine which is equipped with a CNC table for movement of reed valve member 60 with respect to the laser. The area which is hardened is shown in FIG. 4 as area 80 and can be monitored and corrected by making slight changes in the coordinates of the CNC table. In order to minimize oxidation, burning and melting, the top and bottom surface of area 80 being exposed to the laser is bathed in a nitrogen atmosphere during the heat treating operation.

Area 80 around each slot 68, as shown in FIG. 4, is then exposed to the laser for the proper length of time and power settings to produce the through hardening of area 80. A transmissive beam integrator is used to achieve a uniform power distribution on the surface of valve member 60 and to focus the laser beam onto area 80. A $CO_2$ Continuous Wave Photon Versa-Laser V1200 having a wave length of 10600 nanometers, a maximum design power of 1350 watts and a maximum current of 35 amps, 60 Hz has provided acceptable heat treated patterns when the power level has been allowed to stabilize at a value above 550 watts. A time exposure range of 0.8 to 1.2 seconds has been found to be acceptable for a 0.022 inch reed thickness. An optimal power/time setting is one that puts the most heat into the reed in the shortest amount of time and thus produces the required hardness values with little or no visible surface melting when looked at through a 20X magnifier.

The above power and time settings will produce an acceptable reed valve member when the reed valve member has a thickness of 0.022 inches. A thicker reed valve member may require a higher power and/or increased time setting while a thinner reed valve member by require a lower power and/or decreased time setting. The change to the thickness of the reed valve member will thus require a re-optimization of both the power and the time settings.

After being laser hardened, reed valve member 60 is cold soaked at a part temperature of −120° F. Max for a minimum of 2 hours. Reed valve member 60 should begin the cold soak cycle no more than 3 hours after being heat treated. The cold soak cycle is used to minimize the amount of retained austenite in the material.

Upon the completion of the cold soak, reed valve member 60 should be allowed to return to ambient temperature and then it should be tempered at a part temperature of 325° to 350° F. for 90 minutes. Reed valve member 60 should begin the temper cycle no more than 2 hours after being cold soaked. The matrix microstructure in the laser hardened region should be tempered martensite. The chromium carbides should be partly decomposed in this region. No visual retained austenite when viewed at 500X should be detected in the matrix. The presence of melting is undesirable unless it is limited to a thin surface layer. The minimum hardness reading after tempering shall be 88.0 Rockwell 15N, within area 80. While there will be a transition zone between the base material of tab 66 and its associated hardened area 80, this transitional zone should be kept to a minimum. The above described laser hardening process is capable of keeping the transitional zone below the preferred maximum allowable 0.060 inches in width.

FIG. 5 illustrates an area 82 of tab 66 of reed valve member 60 which is shot peened after completion of the laser heat treating operation described above. The heat treating operation of tabs 66 removes residual compressive stresses from the surface of tabs 66. The shot peening of the surface restores the compressive stresses, eliminating sub-surface cracks and significantly increasing the fatigue life of tabs 66. Tabs 66 are shot peened on both sides of both tabs including the inside periphery of slot 68 in area 82. Small non-ferrous shot such as glass or ceramic is used so that contaminants are not imparted on the surface and to provide complete coverage inside slot 68. The intensity of the peening process should be monitored in accordance to Military Specification Mil-S-13165C, for a steel part with a thickness equal to that of reed valve member 60. This is to be measured with a Type N, Grade II Almen Strip, at an intensity of 0.005–0.007. Tab 66 should be masked to ensure 0% overspray. Tab 66 must yield compressive stresses of 150 Ksi minimum at the surface in the heat treated area after shot peening.

Figure 6:
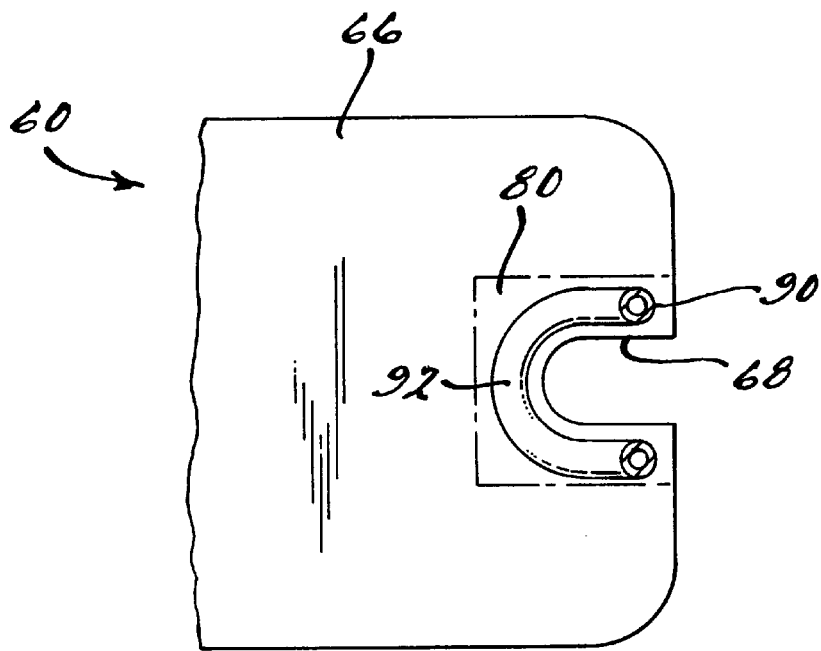
FIG. 6 is a plan view of an induction heat treat process in accordance with another embodiment of the present invention.
Figure 7:
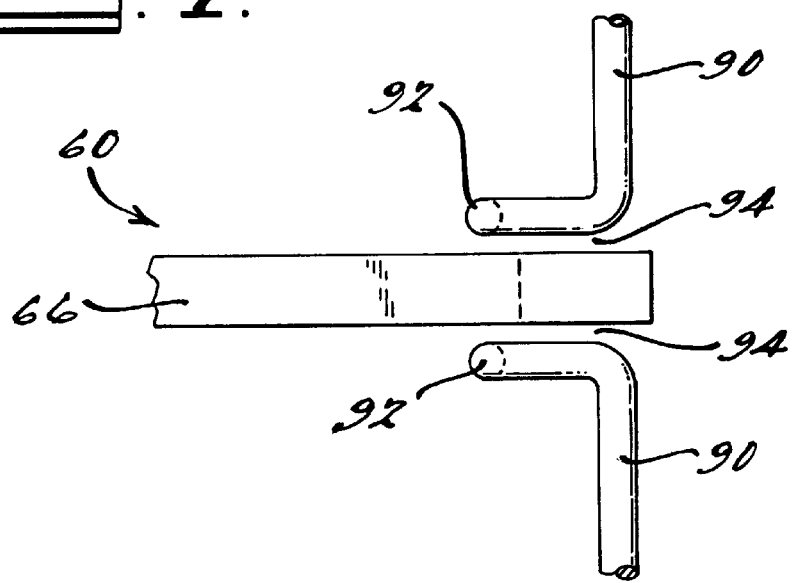
FIG. 7 is an end view of the induction heat treat process shown in FIG. 6.

A second embodiment of the present invention replaces the laser heat treating process with an Impulse Induction Hardening Process. The final heat treat specifications are identical for both the laser heat treating process and the impulse induction hardening process and both processes include the shot peening of area 82 described above. The induction hardening process is illustrated in FIGS. 6 and 7. FIGS. 6 and 7 illustrate suction reed valve member 60 positioned between a pair of induction coils 90 which are part of an induction hardening machine (not shown).

Impulse Induction Hardening uses capacitively stored energy and developed electronics to generate a rectangular pulse with a high power peak. This rectangular pulse, with an accurately controlled energy and duration, is coupled into area 80 of reed valve member 60 by induction coils 90. Induction coils 90 are custom shaped in order to obtain the desired localized hardening in area 80. One machine which is capable of providing this rectangular pulse is manufactured by Tanne Induction of Germany. Tanne model "DAVID" with a power rating of 0–8.5 kV working frequency of 27.12 Megahertz has proven to provide acceptable heat treat patterns.

The induction hardening process offers the advantage that the coating operation can be eliminated. Reed valve member 60 is positioned manually or automatically in a fixture on the induction hardening machine. The positioning of reed valve member 60 would ensure proper x-y alignment with respect to induction coils 90. Tabs 66 of reed valve member 60 are located between an end loop 92 of each induction coil 90 as shown in FIGS. 6 and 7. A specified gap 94 is maintained between each end loop 92 of induction coils 90.

Area 80 of each tab 66 is exposed to the induction pulse for the proper length of time and the proper power settings of the machine. A flux concentrator may be used as well as covering area 80 with an inert gas as described above. A machine setting of 6.5 kV with a 70 millisecond pulse has shown acceptable results for a reed thickness of 0.022 inch. The power and duration of the pulse must be controlled so that adequate hardening takes place but care must be taken to not melt or blow the coil as a result of too much power. Burning and melting are not desired within area 80 as described above for laser heat treating.

Similar to the laser hardening process, a change to the thickness of the reed valve member will require a re-optimization to the machine settings of the induction hardener in order to allow the reed valve member to meet the performance requirements.

Similar to the laser heat treatment described above, the rate of heat input and heat extraction is very rapid. There is no need for quenchant to assist in heat removal. After the heat treating is turned off, the part self quenches. This is the case for both laser and induction hardening.

Once heat treated, cold soaking, tempering and shot peening as described above for the laser hardening process are incorporated into the induction hardening process.

The above defined heat treat and surface finish processes for suction reed valve members 60 provide reed valve members which significantly out-perform the prior art reed valve members.

While the above detailed description describes the preferred embodiment of the present invention, it should be understood that the present invention is susceptible to modification, variation and alteration without deviating from the scope and fair meaning of the subjoined claims.

What is claimed is:

1. A pressure responsive valve assembly for a compression chamber, said valve assembly comprising:

a valve plate having an inner surface defining a discharge chamber and a suction chamber;

a pressure responsive discharge valve member disposed between said discharge chamber and said compression chamber; and a single piece responsive suction valve member disposed between said suction chamber and said compression chamber, said suction valve member having a first hardness level and at least one tab which includes a through hardened portion having a second hardness level, said second hardness level being greater than said first hardness level.

2. The valve assembly in accordance with claim 1 wherein said at least one tab includes a non-through hardened portion.

3. The valve assembly in accordance with claim 1 wherein said at least one tab defines a slot, said through hardened portion extending around said slot.

4. The valve assembly in accordance with claim 1 wherein said at least one tab comprises a pair of diametrically opposed radially outwardly extending tabs, each of said tabs including a through hardened portion.

5. The valve assembly in accordance with claim 4 wherein each of said tabs includes a non-through hardened portion.

6. The valve assembly in accordance with claim 4 wherein each of said tabs defines a slot, said through hardened portion extending around said slot, respectively.

7. The valve assembly in accordance with claim 1 wherein said suction valve member comprises an annular ring and said at least one tab comprises a pair of diametrically opposed radially outwardly extending tabs, each of said tabs including a through hardened portion.

8. The valve assembly in accordance with claim 7 wherein each of said tabs includes a non-through hardened portion.

9. The valve assembly in accordance with claim 7 wherein each of said tabs defines a slot, said through hardened portion extending around said slot, respectively.

10. A single piece reed valve member comprising:
a body having a first hardness level; and
at least one tab extending from said body, said at least one tab including a through hardened portion having a second hardness level, said second hardness level being greater than said first hardness level, said at least one tab includes a non-through hardened portion.

11. The reed valve member in accordance with claim 10 wherein said at least one tab defines a slot, said through hardened portion extending through said slot.

12. The reed valve member in accordance with claim 10 wherein said at least one tab comprises a pair of diametrically opposed radially outwardly extending tabs, each of said tabs including a through hardened portion.

13. The reed valve member in accordance with claim 12 wherein each of said tabs includes a non-through hardened portion.

14. The reed valve member in accordance with claim 12 wherein each of said tabs defines a slot, said through hardened portion extending around said slot, respectively.

15. The reed valve member in accordance with claim 10 wherein said body comprises an annular ring and said at least one tab comprises a pair of diametrically opposed radially outwardly extending tabs, each of said tabs including a through hardened portion.

16. The reed valve member in accordance with claim 15 wherein each of said tabs includes a non-through hardened portion.

17. The reed valve member in accordance with claim 15 wherein each of said tabs defines a slot, said through hardened portion extending around said slot, respectively.

* * * * *

UNITED STATES PATENT AND TRADEMARK OFFICE
CERTIFICATE OF CORRECTION

PATENT NO. : 5,960,825
DATED : October 5, 1999
INVENTOR(S) : Marc J. Scancarello et al It is certified that error appears in the above-identified patent and that said Letters Patent is hereby corrected as shown below:

Column 1, line 33, "complimentary" should be -- complementary --.

Column 1, line 51, "4,877,382" should be -- 4,470,774 --.

Column 1, line 53, "4,877,382" should be -- 4,470,774 --.

Column 5, line 11, "by" should be -- may --.

Signed and Sealed this

Twenty-third Day of January, 2001

Attest:

Q. TODD DICKINSON

*Attesting Officer*        *Commissioner of Patents and Trademarks*